United States Patent
Sheppard

(10) Patent No.: US 11,592,598 B1
(45) Date of Patent: Feb. 28, 2023

(54) VIRTUAL LENS OPTICAL SYSTEM

(71) Applicant: Perry J. Sheppard, Pawnee, OK (US)

(72) Inventor: Perry J. Sheppard, Pawnee, OK (US)

( * ) Notice: Subject to any disclaimer, the term of this patent is extended or adjusted under 35 U.S.C. 154(b) by 351 days.

(21) Appl. No.: 16/879,490

(22) Filed: May 20, 2020

Related U.S. Application Data

(60) Provisional application No. 62/850,185, filed on May 20, 2019.

(51) Int. Cl.
*G02B 3/00* (2006.01)
*G02B 7/02* (2021.01)
*G06T 5/50* (2006.01)

(52) U.S. Cl.
CPC ........... *G02B 3/0056* (2013.01); *G02B 7/021* (2013.01); *G06T 5/50* (2013.01); *G06T 2207/20221* (2013.01)

(58) Field of Classification Search
CPC ........ G02B 3/0056; G02B 7/021; G06T 5/50; G06T 2207/20221; G06T 3/4053; H04N 5/23238; H04N 13/232; H04N 13/282; H04N 13/243
See application file for complete search history.

(56) References Cited

U.S. PATENT DOCUMENTS

| | | | | |
|---|---|---|---|---|
| 9,479,697 B2 * | 10/2016 | Aguilar | ................ | H04N 5/2258 |
| 11,012,618 B2 * | 5/2021 | Dallmeier | .............. | G03B 37/04 |
| 2003/0071891 A1 * | 4/2003 | Geng | ................ | H04N 5/23293 |
| | | | | 348/E5.042 |
| 2004/0041914 A1 * | 3/2004 | Peters, III | ............ | H04N 5/2251 |
| | | | | 348/207.99 |
| 2006/0108505 A1 * | 5/2006 | Gruhlke | ................ | G03B 17/00 |
| | | | | 250/208.1 |
| 2007/0206098 A1 * | 9/2007 | Matsuo | ............. | G06V 40/1312 |
| | | | | 348/207.99 |
| 2013/0021486 A1 * | 1/2013 | Richardson | .......... | H04N 13/282 |
| | | | | 348/E5.042 |
| 2013/0242161 A1 * | 9/2013 | Kobayashi | ........... | H04N 5/2171 |
| | | | | 348/340 |
| 2014/0267596 A1 * | 9/2014 | Geerds | ............... | H04N 5/23238 |
| | | | | 348/38 |
| 2015/0373266 A1 * | 12/2015 | Hsieh | ................... | H04N 5/2252 |
| | | | | 348/36 |
| 2016/0191813 A1 * | 6/2016 | Wu | ...................... | H04N 5/2252 |
| | | | | 348/159 |
| 2016/0212409 A1 * | 7/2016 | Cole | .................... | H04N 13/243 |
| 2016/0269716 A1 * | 9/2016 | Cole | .................... | H04N 13/282 |
| 2017/0244948 A1 * | 8/2017 | Pang | .................. | H04N 5/22541 |
| 2018/0035134 A1 * | 2/2018 | Pang | .................. | H04N 13/156 |
| 2020/0007762 A1 * | 1/2020 | Dallmeier | .............. | G03B 17/02 |
| 2020/0257093 A1 * | 8/2020 | Kozaki | ................. | G02B 27/64 |

* cited by examiner

*Primary Examiner* — Chiawei Chen
(74) *Attorney, Agent, or Firm* — GableGotwals

(57) ABSTRACT

An optical system has a virtual lens comprising an array of image sensors and processor in communication with the virtual lens and configured to focus the at least one virtual lens by way of mathematical image processing of a dynamic object plane.

9 Claims, 2 Drawing Sheets

VIRTUAL LENS OPTICAL SYSTEM

CROSS-REFERENCE TO CO-PENDING APPLICATIONS

This application claims priority to U.S. Provisional Application No. 62/850,185, filed May 20, 2019, the entire application is incorporated herein by reference.

BACKGROUND

This disclosure is in the field of optical systems and, in particular, optical systems that are not fixed-focal length lens-centric or require mechanical means for focusing.

There are a lot of optical systems that we encounter in our daily lives. The cameras in our phones are optical systems based on a lens and an image sensor. There are surveillance cameras around our homes, places of work and public facilities that are similarly based on an optical lens system and an image sensor. There are military and other government agencies with more sophisticated surveillance systems that are based on the same optical systems. There are large telescopes that are more complex optical systems that are used for deep space observation.

These prior art optical systems have limitations. The main limitation is they rely on lenses with fixed focal lengths. They rely on mechanical means of moving lenses for focusing. The lens based optical system can only be focused on one object at a time. They also tend to be only usable to one user at a time. If the image is connected to the internet or a monitor others can see what the user is seeing but they have no control to focus in on another object of interest to them. We also have artificial intelligence ("AI") systems that use optical systems for gathering data for a verity of applications but the focus is fixed or is mechanically controlled via electronic motors by the AI.

SUMMARY

Embodiments of a virtual lens optical system of this disclosure overcomes the prior art limitations by providing an optical system that is not lens-centric. The system includes one or more virtual lenses comprised of image sensors where the zooming in and out and the focusing may be accomplished mathematically by image processing of a dynamic (and instantly changeable) object plane. The image sensors, which may include thermal sensors, may be interleaved or allocated to a same resolution or to a different resolution. The light or image detected by the sensors can be processed simultaneously through multiple signal processing (DSP) engines. Optical transfer functions of a kind known in the art may be applied by the engines to synthesize the data into a desired optical (lens) system. The system may simultaneously stream the images at a same focal length or at different focal lengths to different displays.

In embodiments, the virtual lens may include a plurality of image sensors arranged in an array. The array may be a spoke-and-wheel shaped array including an image sensor located at a center point of the array and additional image sensors spaced apart from one another along predetermined radial locations emanating from the center point. Each image sensor of the array detects or sees the same light reflected by an object but, based upon its position in the array, has different phase information than any other image sensor of the array. Optical transfer functions of a kind known in the art may be applied to synthesize the detected light into a desired optical (lens) system.

In some embodiments, a lens may be necessary. For example, a lens may be provided to protect the image sensors and electronics. Or, a lens may be included for filtering or some other image-related function of a kind known in the art.

DETAILED DESCRIPTION

Figure 1:
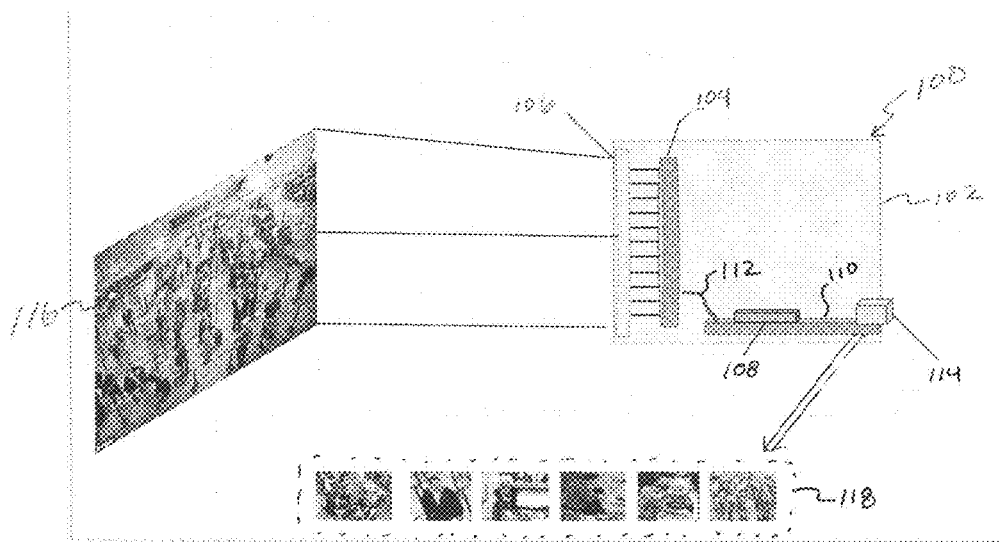
FIG. 1 is a schematic diagram of one embodiment of a virtual lens system according to aspects of the present disclosure.

Referring now to FIG. 1, a schematic diagram of one embodiment of a virtual lens system 100 according to aspects of the present disclosure is shown. According to various embodiments, a virtual lens is an optical system like a camera but is not based on physical lenses. Instead of having a physical lens system and an image sensor it utilizes an array of image sensors 104 to synthesis a lens or complex lens system of different sizes and focal lengths. Physical lens-centric cameras use lenses with fixed focal lengths and focusing and zooming is performed mechanically by adjusting the lens's position with respect to the image sensor. With a virtual lens-centric optical system, such as the system 100, focusing and zooming is accomplished mathematically by processing raw data from the array of image sensors 104. In some embodiments, a protective lens 106 may be provided to protect the image sensors 104 and other components. The lens 106 may be a protective sheet of optically clear (or substantially clear) material. However, it may also provide for filtering or image-altering functions of a kind known in the art.

In embodiments of the present disclosure, optical transfer functions synthesize the desired optical system or output. Transfer functions for a given lens (e.g., the system 100) may be represented mathematically by a variety of Fourier transfer functions, convolution theory, diffraction theory and others. For example, the virtual lens system 100 may generate transfer functions based on a desired optical system's fixed focal length and size dynamically. Because the transfer functions are dynamic, multiple transfer functions may run simultaneously allowing multiple objects to be in focus at the same time.

In various embodiments, the virtual lens system 100 may rely heavily on massive parallel processing in field programmable gate arrays (FPGAs). These FPGAs can have thousands of digital signal processing (DSP) engines running in parallel and, in some embodiments, may be capable of performing up to 10 trillion DSP operations per second in a single device. As available DSP processing capabilities and higher speed data access improve, so does the capability of the virtual lens optical system. Here, the transfer functions and other processing may be represented by the system-ona-chip device 108. As is known in the art, microprocessors, microcontrollers, FPGAs and other commercial silicon systems can be used to execute transfer functions and other processing.

The virtual lens system 100 may process raw spectral data from pixels provided by one or more image sensors (e.g., FIGS. 2A-2C discussed below). Dynamic transfer function coefficients may be used to calculate and create an image. Array functions such as, but not limited to, discrete cosine transforms, convolutions and others also may be used to create the image. Data from the array of image sensors 104 may be provided to the system on a chip 108 via data leads or data bus 112, which may comprise various voltage signaling leads, and connectors as are known in the art.

FIG. 1 illustrates the system 100 in context arranged to collect image data from a scene 116. It should be understood that the scene 116 could be any environment or object for which image data can be collected. Without limitation, this may include outdoor or indoor scenes, environmental scenes, natural settings, assembly lines, crowd or security control areas, industrial areas, celestial scenes or others. Spectra observed may include, without limitation, visible, ultraviolet, infrared, etc.

The system 100 may include a durable casing 102 that retains the lens 106 and image sensor array 104 in proper orientation with respect to one another and directed toward the appropriate scene 116. The casing 102 may provide for various mounting options (e.g., bracket, tripod, or others). In some embodiments, the casing 102 retains a circuit board 110 onto which the system-on-a-chip 108 is mounted. If separate internal memory chips are utilized, they may be mounted on the circuit board 110 as well. Necessary power supplies and/or power conditioning circuitry may also be provided inside the casing 100. In some cases, the system 100 is battery powered. In some cases, it may be configured for use with an external power supply instead of or in addition to an internal power supply. The system 100 further includes a port 114 for transmission of the gathered image data. In some embodiments the port 114 comprises a universal serial bus (USB), ethernet, or other interface. In some embodiments, the port 114 may be implemented wirelessly (e.g., via Wi-Fi® or Bluetooth®).

The system 100, providing a virtual lens system based on calculations and transfer functions from raw pixel data, can be used by multiple users and/or to provide multiple final images (or video streams). For example, separate portions of the raw image data may be used to construct multiple scenes, scene with different properties, zoom angles, spectra and other data. These are shown diagrammatically as a series of images 118 all based simultaneously on the scene 116. These may be stored to an electronic memory and or displayed simultaneously on one or multiple monitors, computers, tablets, mobile devices, etc.

Figure 2A:
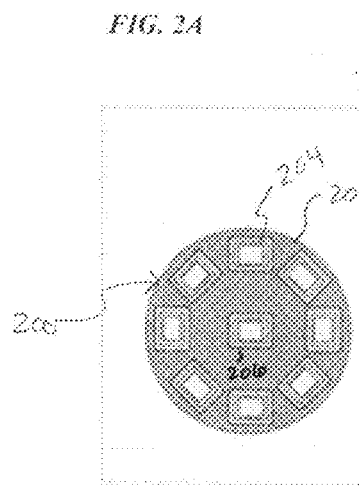
FIG. 2A is a plan view of one embodiment of a virtual lens sensor array for a virtual lens system according to aspects of the present disclosure.

Referring now to FIG. 2A, an illustration of an embodiment of a virtual lens optical system 200 is shown. The virtual lens 200 is one example of a lens that may be used as the lens array 104 discussed above. The virtual lens 200 contains nine image sensors 204 arranged in a spoke-and-wheel-shaped array. In one embodiment, an array may include as few as four image sensors, with one sensor being located at a center point of the array and three sensors located equidistant apart in a same circumferential orbit about the center point. Other embodiments may have many more discrete sensors in various physical arrangements.

The image sensors 204 may be any image sensor suitable for a given application. The virtual lens 200 may be a hybrid virtual lens made with different types of image sensors and, in some embodiments, more than two types may be used. In some embodiments, the image sensor(s) 204 may be a CMOS image sensor, CCD image sensor, hybrid CCD/CMOS image sensor, or their equivalent. The image sensor 204 may be a color image sensor such as a Bayer filter, Foveon X3 sensor, a 3-CCD sensor, or their equivalent. In other embodiments, the image sensor 204 may be a thermal image sensor. For example, an outdoor surveillance system using a virtual lens of this disclosure may include a thermal sensor. The image sensor 204 may be a flat or a curved image sensor.

Applications of a virtual lens optical system according to the present disclosure include, but are not limited to, 3D filming, security camera systems, military surveillance, high altitude surveillance, casino security, personal telescopes, observatories that accommodate multiple users and others. By way of a non-limiting example, the virtual lens optical system may function as an airport security camera application serving multiple monitors simultaneously (See e.g. FIG. 1).

The architecture and physical arrangement for the virtual lens optical systems of the present disclosure may be flexible and expandable. The lens 200 provides a printed circuit board 202 whereupon the individual array elements (sensors 204) are placed or mounted with appropriate voltage and data leads for operation. The lens 200 provides for a single sensor 204 at a center location 206 with eight additional sensors 204 arranged spaced equally apart and from the center in a ring.

Figure 2B:
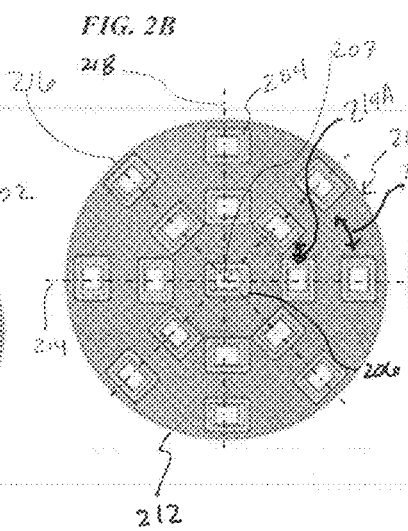
FIG. 2B is a plan view of another embodiment of a virtual lens sensor array for a virtual lens system according to aspects of the present disclosure.

FIG. 2B is an embodiment of a virtual lens array 210 containing seventeen image sensors 204. The sensors 204 are in a one of two circumferential orbits (e.g., inner orbit 219A and outer orbit 219B) about the center point 206 of the array mounted on a board 212. The sensors 204 are arranged along predetermined radial locations shown at axes 214, 216, 218 passing through the center point 206. As shown, there are two sensors 204 spaced apart along each radial arm from the center 206 (one in each orbit). In other embodiments, the radial arrangement may be different, there may be more or fewer orbits, and these may have different numbers of sensors.

Figure 2C:
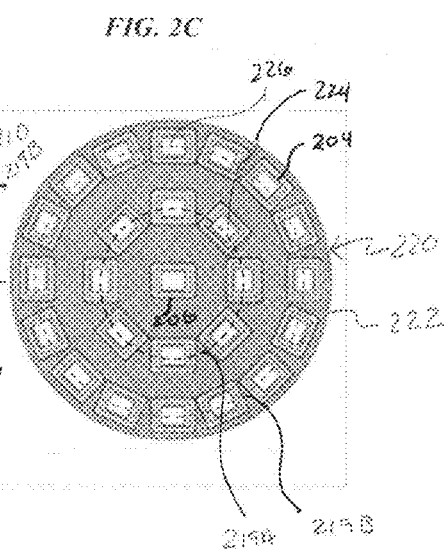
FIG. 2C is a plan view of another embodiment of a virtual lens sensor array for a virtual lens system according to aspects of the present disclosure.

FIG. 2C is an embodiment of a virtual lens array 220 containing twenty-five image sensors mounted on a common board 222. The array includes sensors 204 located on two different circumferential orbits (inner 219A and outer 219B) about the center point 206. Here, the outer orbit 219B contains sixteen sensors 204 while the inner orbit contains eight sensors 204. Thus, there are some sensors 204 in the outer orbit 219B that do not align radially with a specific sensor 204 of the inner orbit 219A. Arrays including more than 25 image sensors may be configured in this or other ways (e.g., different/more radial locations and differing/more orbits). Additionally, the sensors 204 within any of the arrays 200, 210, 220 may have orientations that are the same or different as adjacent or other sensors 204.

Figure 3:
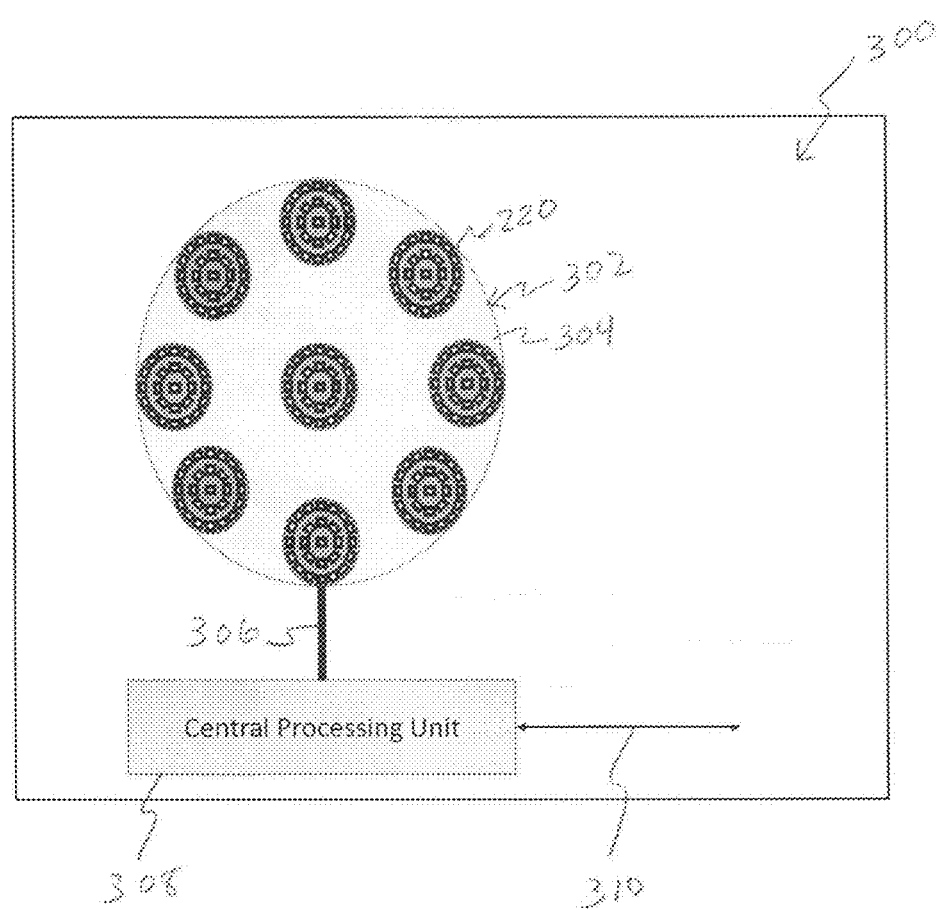
FIG. 3 is a schematic diagram of another embodiment of a virtual lens system according to aspects of the present disclosure.

Referring now to FIG. 3, FIG. 3 is a schematic diagram of another embodiment of a virtual lens system 300 according to aspects of the present disclosure is shown. Here, a plurality of virtual lens systems 220 are themselves arranged in an array within a larger lens array 302. Thus, the system 300 may contain an "array of arrays". Each lens system 220 may operate as described above or may be operated in concert. A high-speed data line 306 may provide the raw data from the individual lens systems 220 to a central processing unit or computer 308. The central processor 308 may comprise a general-purpose computer or a massively parallel computing system capable of handling large amounts of data and/or large bandwidths from the lens array 302. The central processor 308 may comprise a computer or computing network as known in the art. The central processor may implement additional fusion algorithms and transfer functions upon data from the lens array 302 as is known in the art.

The central processing unit 308 may contain memory and data storage systems as are known in the art. The central processing unit 308 may also have a network interface 310 or other data link to allow remote operation and transfer of data (e.g., as over the Internet).

Some applications such as long-range surveillance might use an array of virtual lenses 302 because the desired array size exceeds the practical size of a single printed circuit board (e.g., board 222). An observatory might use an array of arrays of virtual lenses (302) to synthesize a large telescope that allows multiple researchers access simultaneously. When the optical system 300 includes an array of virtual lenses 200, the lenses may dynamically function independently or conjointly.

As discussed, embodiments of a virtual lens optical system (e.g., 100, 300) of this disclosure solve the issue of the fixed focal length lens optical system and the current mechanical nature of the current optical system's focusing, among other problems. These embodiments allow the use of multiple users and can enhance security and surveillance systems. The dynamic nature of the virtual lens can be an excellent enhancement for AI-based threat assessment in security sensitive areas such as airports and other areas.

It should also be understood that the physical arrangement of the lens arrays 220 may differ from that shown in FIG. 3. The lens arrays 220 may be mounted on a stand or board 304 as shown (with proper wiring and power connections, not shown). The lens arrays 220 may face the same or a similar direction as shown. However, in other embodiment, the board 304 may have a 3-dimensional shape such as a square, polygon, hemisphere, sphere, or other. This allows the lens arrays 220 to face in multiple directions. Thus, a wide angle or "fish eye" view may be provided to the central processing unit 308 or other connected devices. It should also be understood that the individual virtual lens arrays 220 could be configured as the lens arrays 200 or 210. Further, the lens arrays on the board 304 could be of multiple types. Thus, it is possible that resolution and viewing capabilities may vary (or may be the same) depending on the direction the target object or scene is from the array 302.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)— (a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

The invention claimed is:

1. An optical system comprising:
   at least one virtual lens comprising an array of image sensors, one image sensor of the array located at a center point, other image sensors of the array located at predetermined radial distances and radial locations relative to the center point;
   a microprocessor in communication with the at least one virtual lens and adapted to focus the at least one virtual lens by way of mathematical image processing of a dynamic object plane; and
   at least one additional virtual lens comprising an additional array of image sensors, one image sensor of the additional array located at a center point of the additional array, other image sensors of the additional array located at predetermined radial distances and radial locations relative to the center point;
   wherein the at least one additional virtual lens is in communication with the microprocessor; and
   wherein the microprocessor is further adapted to focus the at least one additional virtual lens by way of mathematical image processing of the dynamic object plane.

2. The optical system of claim 1, further comprising a lens covering at least one sensor in the array of image sensors.

3. The optical system of claim 1, wherein the other image sensors of the array are arranged in discrete orbits at predetermined distances from the center point.

4. The optical system of claim 3, wherein the other image sensors are arranged in predetermine radial locations in the orbits.

5. The optical system of claim 1, wherein the microprocessor is further configured to provide multiple foci of the dynamic object plane simultaneously.

6. The optical system of claim 1, wherein the multiple foci comprise separate parts of the dynamic object plane.

7. The optical system of claim 6, wherein the separate parts of the dynamic object plane do not overlap.

8. The optical system of claim 1, wherein the at least one virtual lens and the at least one additional virtual lens face different directions.

9. The optical system of claim 8, wherein the at least one virtual lens and the at least one additional virtual lens are mounted to a three-dimensional, multi-sided mount.

* * * * *